United States Patent [19]

Madsen

[11] Patent Number: 4,791,519
[45] Date of Patent: Dec. 13, 1988

[54] SHOCK PROTECTIVE CIRCUIT WITH ELECTRICAL LATCH FOR SMALL APPLIANCES

[75] Inventor: Elmer W. Madsen, Bristol, Conn.

[73] Assignee: North American Philips Corp., New York, N.Y.

[21] Appl. No.: 96,796

[22] Filed: Sep. 11, 1987

Related U.S. Application Data

[63] Continuation of Ser. No. 835,127, Feb. 28, 1986, abandoned.

[51] Int. Cl.⁴ .............................................. H02H 3/16
[52] U.S. Cl. ...................................... 361/42; 361/178; 34/97; 307/118; 307/325; 219/363
[58] Field of Search ................... 361/1, 42, 56, 91, 93, 361/59, 102; 307/178, 118, 326; 324/51; 34/96, 97, 98; 219/363, 364, 369, 370, 373, 322

[56] References Cited

U.S. PATENT DOCUMENTS

| | | | |
|---|---|---|---|
| 4,103,319 | 7/1978 | Crain et al. | 361/178 |
| 4,270,158 | 5/1981 | Gilardoni et al. | 361/42 |
| 4,345,289 | 8/1982 | Howell | 361/45 |
| 4,464,582 | 8/1984 | Aragaki et al. | 361/42 X |
| 4,493,975 | 1/1985 | Yamamoto | 361/1 |
| 4,550,358 | 10/1985 | Crowley et al. | 361/42 |
| 4,687,906 | 8/1987 | Fujishima et al. | 361/178 X |

Primary Examiner—J. R. Scott
Assistant Examiner—Derek S. Jennings

[57] ABSTRACT

An immersion detection current interrupter circuit with an electric latch for use in small electrical appliances. A sensor wire is positioned within an appliance to sense current leakage when in contact with a conductive fluid. A relay or solenoid connected to the sensor is positioned between the load leads in a latch circuit. When the sensor detects a leakage current, it causes a two-pole double-throw relay to latch, breaking the load lines beyond the relay. The relay will remain latched until the power cord is unplugged or reset by a switch which opens and closes the power lines. Once the component has latched, the maximum leakage current will be limited by the voltage drop across a diode.

6 Claims, 2 Drawing Sheets

SHOCK PROTECTIVE CIRCUIT WITH ELECTRICAL LATCH FOR SMALL APPLIANCES

This is a continuation of application Ser. No. 835,127, filed Feb. 28, 1986, abandoned.

CROSS-REFERENCE TO RELATED APPLICATION

This application is related to an application entitled SHOCK PROTECTIVE CIRCUIT WITH MECHANICAL LATCH FOR SMALL APPLIANCES, filed simultaneously herewith by the same inventor.

BACKGROUND OF THE INVENTION

1. Field of the Invention

The invention pertains to the field of shock protection circuits in general and in particular to immersion detection current interrupter circuits designed to protect the user of a small hand-held electrical appliance from a serious electrical shock if the appliance is immersed in or otherwise comes into contact with an electrically conductive fluid.

2. Description of the Prior Art

Shock protective circuits known in the prior art are of two types, ground fault current interrupter circuits (GFCI) and immersion detection current interrupter circuits. Various devices incorporating such circuits are also known in the prior art. GFCI devices are presently required in new electrical installations in bathrooms and other locations. Typically, such devices are included in an assembly connected to an electrical outlet.

Prior art shock protection circuits are designed primarily for electrical devices of substantial size and cost. They tend to be sophisticated, complex devices which, while of substantial economic and safety value, are not appropriate for the volume and variety of inexpensive consumer products in the field of hand-held small electrical appliances. Typical of the prior patent art are the ground fault current interrupting devices disclosed in U.S. Pat. Nos. 4,345,289 and 4,358,708 for use in residential applications. A typical industrial hazard protection device is disclosed in U.S. Pat. No. 4,103,319. Such devices are inappropriate in terms of size, complexity and cost for small consumer appliances.

Shock protection is presently required for wall-mounted hair dryers under UL 859, which is presently a limited standard of dubious value. The closest specific prior art patent is U.S. Pat. No. 4,493,975 which discloses a wall-mounted hand-held hair dryer. The principal power switch for the appliance is contained in the wall-mounted housing. When the appliance is removed from the wall mount, this switch is in the "off" position and no power flows to the appliance. Thus, if the appliance should accidentally or intentionally be immersed in a conductive fluid, it is electrically dead and no shock hazard is present. It thus satisfies the present UL standard 859. To turn on power to the appliance, the user must activate a switch in the wall mount. Simply returning the hand held dryer to the wall mount turns the switch off. The problem with this prior art device and the UL standard itself is that there is no protection from electrical shock when the power switch is in the "on" position.

However, simple, reliable, inexpensive shock protection circuits incorporated in components small enough to be used in hand-held personal care appliances such as hair dryers and curling irons, and similar consumer appliances and tools are not disclosed in the prior patent art nor are such devices commercially available.

The prior art fails to disclose a simple, inexpensive circuit embodied in a small component device which serves to protect the user of a small electrical appliance from electrical shock if the appliance comes into contact with an electrically conductive fluid such as water. The most frequent hazard of this type is the use of hair dryers in a bathroom. When a personal care appliance such as a hair dryer or electric razor come into contact with water, the user may receive an electrical shock which can be fatal. The object of the present invention is to protect the user from a serious shock (above 0.005 amps) while meeting, or exceeding, the requirements of UL 859, paragraph 28.1, and equivalent standards either now in force or to be in force in the near future.

SUMMARY OF THE INVENTION

The present invention is a simple, reliable, inexpensive immersion detection current interrupter circuit to provide shock protection when a hand-held small appliance comes into electrical contact with an electrically conductive fluid such as water, said circuit designed to be packaged as a small component for inclusion within such an appliance or the plug of its power cord. When the appliance is plugged into an electrical power source such as a wall outlet and is immersed in or otherwise comes into electrical contact with a conductive fluid, there will be a current leakage.

The object of the invention is to provide a simple, reliable, inexpensive shock prevention circuit which will limit the maximum current leakage to 0.005 amps after 0.025 seconds. A modified bridge and relay (or solenoid) circuit in conjunction with a simple sensor wire achieves this object. The circuit utilizes a sensor wire to conduct this leakage current. The sensor wire current then activates a relay or solenoid within a modified bridge circuit which disconnects the power leads from the load and causes the relay contacts to latch. After the relay contacts latch in the open position, no current will flow to the appliance.

In the preferred embodiment of the invention using an electric latch, the sensor wire is positioned in various parts of the appliance and in close proximity to the two power leads. The sensor wire conducts a current leakage when the appliance is in contact with a conductive fluid. A relay or solenoid connected to the sensor wire is positioned between the power leads in a latch circuit and connected thereto by pairs of diodes which rectify the current. When the appliance is connected to (plugged into) a power source and the sensor wire comes into contact with a conductive fluid, the sensor wire provides a short path to ground with low resistance for the relay (or solenoid) current. When the sensor conductor detects a leakage current, current flows to the relay, causing the two-pole double-throw relay to latch, interrupting the load lines. If the relay (or solenoid) requires 0.010 amps to activate, the leakage current will be interrupted in less than 0.025 seconds, meeting the standard of less than 5 mA maximum after 0.025 seconds. The bridge formed by the two pairs of diodes and the relay latches the relay contacts in whether the ac line is high or low. When the relay contacts latch, the bridge keeps a low voltage on the sensor no matter how the plug is put in an outlet (normal or reversed polarity). The relay will remain latched until the power cord is unplugged or reset by a switch which opens the power lines. Once the component has latched, the maximum leakage current to ground will be limited by the voltage drop across the diode.

DESCRIPTION OF THE PREFERRED EMBODIMENT

The shock protection device of the present invention is a simple, reliable, inexpensive immersion detection current interrupter circuit which addresses the hazard of the possible severe, even fatal, electrical shock to a person if a hand-supported appliance is dropped into a conductive fluid such as water. Since no-distilled water is a conductive fluid and the hand-held hair dryer is the small appliance most frequently used in close proximity to water, resulting in statistically significant injuries especially among children, the present invention will be described in an embodiment useful in said hair dryers. It is to be understood that the invention is not limited thereto.

Figure 1:
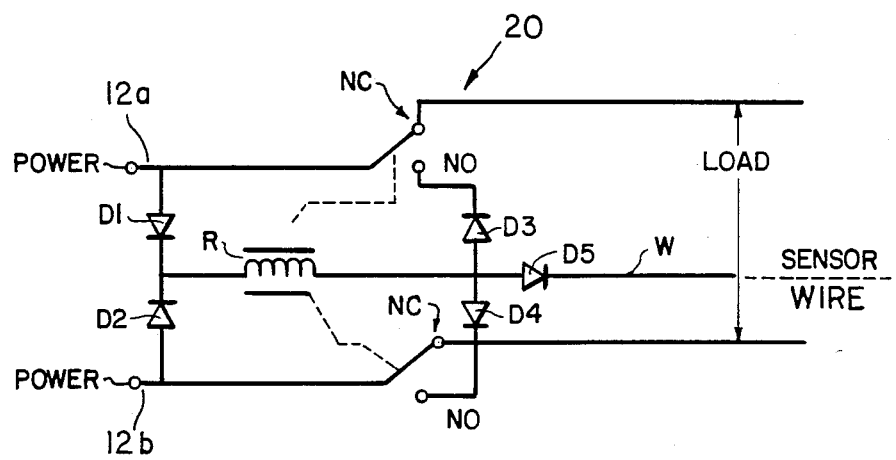
FIG. 1 is a circuit diagram for a shock protection circuit for small appliances using an electrical latch.
Figure 3:
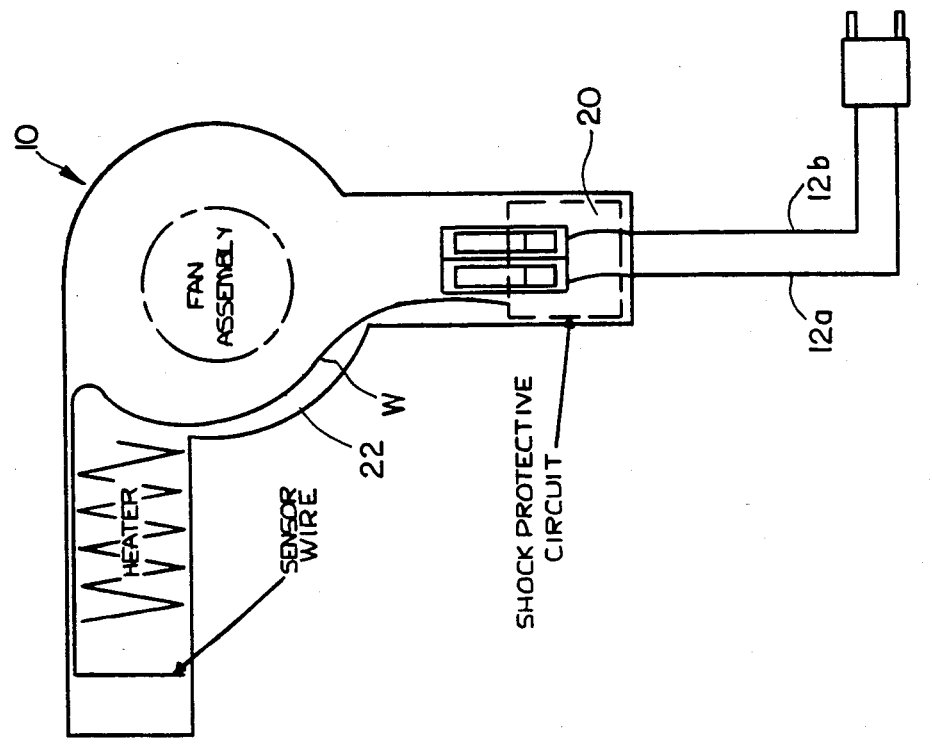
FIG. 3 is a cut-away plan view showing the circuit of FIG. 2 installed in the housing of a hand-held hair dryer.
Figure 2:
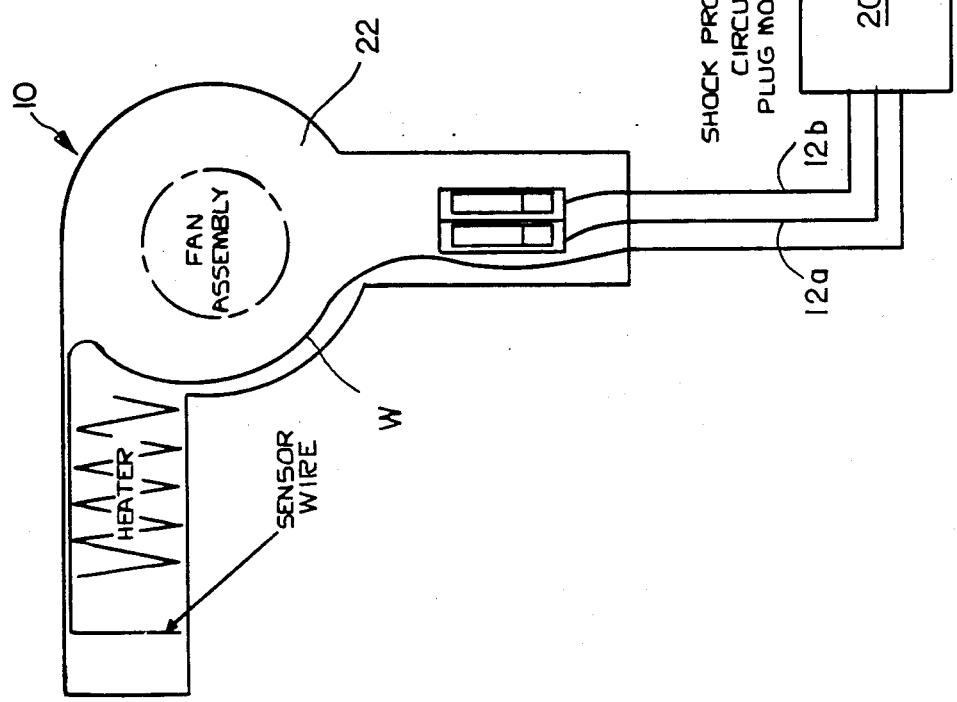
FIG. 2 is a cut-away plan view showing the circuit of FIG. 1 installed in the plug of a hand-held hair dryer.

FIG. 1 is a circuit diagram of the simple immersion detection current interrupter circuit 20 of the present invention. A special sensor conductor in the form of at least one uninsulated (exposed) wire W is positioned in various parts of the small appliance, such as a hair dryer 10 (as shown in FIGS. 2 and 3), to sense leakage currents to ground when the sensor wire, and thus the hair dryer 10, comes into contact with a conductive fluid such as water. The sensor wire W is positioned so that it will conduct a leakage current over the shortest path to ground, either the external ground or the internal ground of the appliance 10. The sensor conductor W is positioned at locations in the appliance 10 where the water path to the ground would normally be shorter than the path from the hot lead (12a or 12b) to ground. It may be in close proximity to one or both of the power leads 12a, 12b or an additional ground wire. Thus, in certain cases conduction may be between the sensor wire W and one of the power leads 12a, 12b. In most cases the sensor conductor would be placed as close as possible to the ground lead (12a or 12b), thus, making a shorter sensor conductor W current path when the appliance 10 is placed under water. The precise positioning of the sensor wire is critical to the effectiveness of the interrupter, and will depend on the configuration of the appliance in which it is installed. In any case it should be close to the power leads also.

Preferably a two-pole double-throw relay R (or a solenoid) is connected within a modified bridge circuit between the two power (load) lines and through the sensor conductor W to ground. The modified bridge circuit between power leads 12a, 12b comprises a pair of diodes D1, D2, biased in opposed directions and connected in series between the two power leads 12a, 12b, a second pair of diodes D3, D4 biased in the opposite directions connected in series to the normally open terminals NO of relay R, and R is connected at a first terminal to a point between D1 and D2 and at a second terminal to a point between D3 and D4. The normally closed terminals NC of relay R are connected to the power lines 12a, 12b. When relay R is latched into its normally open position NO, a bridge circuit results. A fifth diode, D5, connected between the coil of relay R and sensor wire W, serves as a blocking element to block any current but leakage current from flowing to sensor wire W when relay R is latched open. When an electrical path is provided between the sensor wire W and ground sufficient to cause the solenoid or relay R to activate, the relay contacts latch into the normally open (NO) position.

The device operates as follows when power is applied and the solenoid or relay R is connected to the normally closed contacts NC as shown in FIG. 1, and the current through sensor wire W rises above a threshold determined by relay R, the sensor wire W will conduct to ground or to either power lead 12a, 12b, hot or neutral. Within 0.025 seconds the relay will switch to the normally open contacts NO and latch, thus removing power from the appliance. Once latched, the power lines 12a, 12b to the appliance are disconnected and the relay R will remain latched until it is unplugged from the power source. Once the relay or solenoid R has latched, the maximum current drawn by the sensor to ground will be limited to the current through the coil of relay R and diode D5 because of the presence of diodes D3 and D4 in the circuit. Typically the current will always be less than 0.005 amps. The diodes D1 and D2 in the modified bridge rectify the current to the relay R while D3 and D4 maintain a latching current on relay R until the unit is unplugged. Both D1 and D2, as well as D3 and D4 are required because one does not know which power lead, 12a or 12b, is the hot lead and which is ground.

If the distance between the sensor lead and the power leads is small, the current required to pull in the relay R could be 0.010 amps, thus making the relay less expensive. The relay coil can be operated higher than 0.005 amps, to ground, and still maintain its protective function since the unit will open in 0.025 seconds. The diode D5 provides the limiting factor within this time.

In the embodiment illustrated in FIG. 1, the diodes are drawn for a particular current direction. It should be obvious that the diodes could be reversed so that current will flow in the opposite direction.

The circuit of FIG. 1 operates independently of the polarity of the power lines. The ac line plug could be reversed without affecting its operation. Also, if one of the two power leads is broken, the circuit will still operate if the sensor lead is in tact.

In an alternate embodiment, the minimum required components for the circuit would be one-half the modified bridge shown in FIG. 1 using only diodes D1, D4 and D5.

The device of the present invention is a simple, reliable and inexpensive immersion detection current interrupter circuit which can be incorporated within the housing of a hand-held appliance as shown in FIG. 3, said circuit being used to disconnect power to the appliance via a relay or solenoid. In order to prevent bodily injury, it is desirable that the triggering current required to energize the relay be kept to about 5 mA. This threshold level allows for leakage currents that are inherent in most electrical devices and minimizes false triggers. This current level may be achieved by incorporating a resistor in series with the relay coil or by setting the resistance of the relay coil to the limiting value. One or two relays or solenoids may be used.

The circuit of the present invention is user resettable. The unit may be reset by disconnecting the power leads from their power source and reconnecting them again. For the customary appliance this is usually done by unplugging the unit and plugging it in again. However any means to break and reconnect a power line between the power source and the bridge circuit will suffice. Of course, the unit must be dry to reset.

When a conductive fluid comes into contact with any part of the immersion detector or sensor within the housing, current will flow through the fluid to ground, triggering the control circuit to disconnect the appliance from the ac line. An additional feature of this immersion detection current interrupter is that the protection is available to the user whether the hand-supported appliance is switched off or on, that is, protection is available whenever the appliance is energized in the presence of a hazardous condition.

The circuit 20 of FIG. 1 can be incorporated within the housing of a small appliance such as hair dryer 10, as shown in FIG. 3, in which case only a two-wire power cord is required. FIG. 3 shows in cross-section a typical prior art hair dryer 10 which may incorporate the protective circuit 20 of the invention. The precise location of circuit 20 within housing 22 is a matter of design choice. Known details of the dryer are not shown. The sensor wire W then runs from circuit 20 throughout the housing 22. Alternatively, the circuit could be incorporated within the power plug 24 as shown in FIG. 2, in which case a three-wire cord is required, the third wire being the sensor wire W. FIG. 2 is also a cross-sectional view of a conventional hair dryer 10, showing an alternate location for protective circuit 20. This sensor wire W outside the appliance housing could be a wire mesh around the power leads 12a, 12b, or a bare wire with a loose porous sleeve around one or both of the power leads. Within the appliance 10, the sensor conductor could be a conductive strip, a conductive coating or a ring. The sensor conductor could be one or more wires, at least one of which is in close proximity to the power leads or an additional ground wire. In certain cases, conduction may be between a sensor lead and one of the power leads, depending on polarity of the leads. In any event, the sensor should be close to the power lines to provide a good path for conduction in water.

The circuit of FIG. 1 is thus a very simple circuit with few components, thereby yielding a very reliable circuit which is very inexpensive to manufacture and hence appropriate for low cost small consumer appliances.

Most importantly, the circuit of FIG. 1 is immune to electrical noise and will not false trigger or nuisance trigger.

While the present UL 859 standard requires a shock protective circuit only when the appliance power switch is in the "off" position, it is anticipated that this requirement will be extended to cover the "on" position of the switch. In any event, the circuit of the present invention works with the power switch in either position. The shock protection is available any time the unit is energized.

The advantage of the present invention is that it provides the lowest possible cost for a user resettable shock protection circuit which is fast and reliable. In addition, after latching, the current in the sensor is limited to safe levels until the appliance is unplugged. Furthermore, if the shock protection circuit is placed in the appliance plug, no components of the appliance are required to be sealed.

A fault indicator signal could be added to the latch mode to warn of an existing fault. This could be a signal light connected to the NO relay contacts.

I claim:

1. A shock protection circuit for a small, hand-held electrical appliance having two power wires and a housing comprising:
    a first set of two opposed diodes being connected between said two power wires and having a common junction between them,
    conductive sensor means within said housing and connected to said common junction between said opposed diodes to detect the presence of a leakage current within said appliance when said opposed diodes and said power wires are connected to a source of electricity and said appliance comes into contact with a conductive fluid,
    said conductive sensor means including a sensor wire positioned within said housing such that said sensor wire comes into contact with said conductive fluid when said appliance does, said sensor wire providing a conductor path for said leakage current to flow through,
    said conductive sensor means including circuit opening means operating in response to said leakage current exceeding a predetermined level and disconnecting said power wires from said source of electricity,
    said circuit opening means maintaining said power wires disconnected from said source of electricity as long as said opposed diodes are connected to said source.

2. A shock protection circuit as claimed in claim 1, wherein said circuit opening means includes a two-pole double throw relay having a coil and wherein said first set of opposed diodes act as rectifiers for supplying a DC voltage to said coil.

3. A shock protection circuit as claimed in claim 1, wherein said relay includes contacts which connect said power wires to said source of electricity when said relay is unactuated and disconnect said power wires from said source when said relay is actuated.

4. A shock protection circuit as claimed in claim 3, wherein a second set of two opposed diodes oppositely polled from said first set forms a bridge circuit with said first set to maintain power to the coil of said relay when operated to its actuated condition.

5. A shock protection circuit as claimed in claim 4, wherein said second set of opposed diodes also includes a junction point therebetween and wherein a fifth diode is connected between the junction point of said second set of diodes and said sensor wire.

6. A shock protection circuit as claimed in claim 5, wherein the coil of said relay is connected between the junction point of said first set of diodes and the junction point of said second set of diodes.

* * * * *